US012470044B2

United States Patent
Tong et al.

(10) Patent No.: US 12,470,044 B2
(45) Date of Patent: Nov. 11, 2025

(54) TWO-DIMENSIONAL PHOTONIC CRYSTAL SURFACE EMITTING LASER

(71) Applicant: Changchun Institute of Optics, Fine Mechanics and Physics, Chinese Academy of Sciences, Changchun (CN)

(72) Inventors: Cunzhu Tong, Changchun (CN); Ziye Wang, Changchun (CN); Pinyao Wang, Changchun (CN); Huanyu Lu, Changchun (CN); Lijie Wang, Changchun (CN)

(73) Assignee: Changchun Institute of Optics, Fine Mechanics and Physics, Chinese Academy of Sciences, Changchun (CN)

( * ) Notice: Subject to any disclaimer, the term of this patent is extended or adjusted under 35 U.S.C. 154(b) by 0 days.

(21) Appl. No.: 18/971,777

(22) Filed: Dec. 6, 2024

(65) Prior Publication Data

US 2025/0273930 A1    Aug. 28, 2025

(51) Int. Cl.
*H01S 5/11* (2021.01)
*H01S 5/18* (2021.01)
*H01S 5/30* (2006.01)

(52) U.S. Cl.
CPC ............... *H01S 5/11* (2021.01); *H01S 5/18* (2013.01); *H01S 5/3054* (2013.01)

(58) Field of Classification Search
CPC ... H01S 5/11; H01S 5/18; H01S 5/185; H01S 5/3054
See application file for complete search history.

(56) References Cited

U.S. PATENT DOCUMENTS

| 2009/0175304 | A1 | 7/2009 | Noda et al. |
| 2011/0188526 | A1 | 8/2011 | Noda et al. |
| 2022/0320827 | A1* | 10/2022 | Chen ............... H01S 5/183 |
| 2023/0387659 | A1* | 11/2023 | Noda ................ H01S 5/11 |
| 2024/0120710 | A1* | 4/2024 | Noda ................ H01S 5/185 |

FOREIGN PATENT DOCUMENTS

| CN | 112262508 A | 1/2021 |
| CN | 115085004 A | 9/2022 |

OTHER PUBLICATIONS

First Office Action issued in counterpart Chinese Patent Application No. 202410211429.9, dated Dec. 19, 2024.

\* cited by examiner

*Primary Examiner* — Tod T Van Roy
*Assistant Examiner* — Delma R Forde
(74) *Attorney, Agent, or Firm* — Westbridge IP LLC

(57) ABSTRACT

A two-dimensional photonic crystal surface emitting laser includes an n-doped substrate, an n-doped cladding layer, an active layer, a photonic crystal layer, a p-doped cladding layer and a p-doped contact layer arranged in sequence from top to bottom. The photonic crystal layer includes a base material and a plurality of unit cells arranged periodically, each unit cell includes a first different-refractive index region, a second different-refractive index region and a third different-refractive index region that have a different refractive index from the base material. The surface emitting laser based on the photonic crystal structure may maintain single-mode operating characteristics of a device under a large mode field area, so that a high-power single-mode surface emitting laser may be achieved.

8 Claims, 6 Drawing Sheets

TWO-DIMENSIONAL PHOTONIC CRYSTAL SURFACE EMITTING LASER

CROSS-REFERENCE TO RELATED APPLICATIONS

This application claims priority to Chinese Patent Application No. 202410211429.9, filed on Feb. 27, 2024, the content of which is incorporated herein by reference in its entirety.

TECHNICAL FIELD

The present disclosure relates to a field of semiconductor laser technology, and in particular to a two-dimensional photonic crystal surface emitting laser.

BACKGROUND

Semiconductor lasers have advantages of small size, high electro-optical conversion efficiency and low cost, and are therefore widely used in laser pumping, laser processing, laser radar, laser lighting and other fields. Generally, these application scenarios have high requirements on an output power, a beam divergence angle or a brightness of a laser. A semiconductor laser has a large beam divergence angle due to a small single-mode light-emitting region, which becomes a major shortcoming. For example, an edge emitting semiconductor laser has a fast axis divergence angle of about 20°, and a vertical cavity surface emitting laser has a divergence angle of about 10°. In order to meet application requirements, it is often needed to provide an additional lens system for collimation, which increases an application cost and reduces a reliability of the system.

The emergence of photonic crystal surface emitting laser (PCSEL) has changed this situation. The photonic crystal surface emitting laser may achieve a single-mode operation with a large mode field area, thus achieving a small divergence angle. Compared with the edge emitting laser and the vertical cavity surface emitting laser that use a Fabry-Perot cavity as a resonant cavity, the photonic crystal surface emitting laser may have a better selectivity for a resonant mode due to a distributed feedback mechanism of the resonant cavity. It is possible to change lasing thresholds of different resonant modes in the resonant cavity by adjusting parameters of photonic crystal. The larger the threshold difference between a fundamental mode and a higher-order mode, the more stable the single-mode operation of the laser. Furthermore, it is possible to extract a light field energy oscillating parallel to a junction plane into a direction perpendicular to the junction plane by using a second-order Bragg diffraction, thereby achieving a vertical output of a laser beam.

At present, the threshold difference between the fundamental mode and the higher-order mode is increased mainly by two methods. A first method is to adopt a double-lattice photonic crystal cavity to change a distance between two mutually nested lattices and adjust a shape of a photonic crystal hole. In this method, the structure is simple, but the two sets of lattices need to have different hole shapes, such as an "ellipse+circle" configuration that is mainly used at present. Such difference in pattern poses a great challenge to subsequent pattern exposure and hole etching processes, and a preparation cost may be increased. At a micro-nano scale, a shape and a size of a hole may have a great influence on an etching hole depth under the same etching condition. This means the two etching holes may have a large difference in depth, which may bring difficulties to a batch manufacturing process such as nanoimprinting. A second method is to adopt a topological photonic crystal cavity to use a bandgap mode as an operating mode of the laser. This method may also achieve a large threshold difference, and the holes have the same shape, which avoids the problem of uneven etching depth. However, compared with a square lattice photonic crystal cavity (the aforementioned double lattice photonic crystal cavity is a type of square lattice photonic crystal cavity), the photonic crystal of the topological cavity has a more complex in-plane pattern and higher requirements for electron beam exposure. In addition, there are problems such as difficulty in electrical pumping and complex far-field patterns.

SUMMARY

In view of this, a main objective of the present disclosure is to provide a two-dimensional photonic crystal surface emitting laser. Based on the photonic crystal surface emitting laser, it is possible to maintain single-mode operating characteristics of a device under a large mode field area, thereby achieving a high-power single-mode surface emitting laser.

In order to achieve the above objective, the present disclosure adopts the following technical solutions.

The present disclosure provides a two-dimensional photonic crystal surface emitting laser, including an n-doped substrate, an n-doped cladding layer, an active layer, a photonic crystal layer, a p-doped cladding layer and a p-doped contact layer arranged in sequence from top to bottom; the photonic crystal layer includes a base material and a plurality of unit cells arranged periodically, each unit cell includes a first different-refractive index region, a second different-refractive index region and a third different-refractive index region that have a different refractive index from the base material.

Preferably, a square Ni/Au-Ge/Ni/Au metal film is deposited on a surface of the n-doped substrate, a circular Ti/Pt/Au metal film is deposited on a surface of the p-doped contact layer, and a circular light emitting hole is provided at a center of the square Ni/Au-Ge/Ni/Au metal film.

Preferably, a distance between a center of gravity of the second different-refractive index region and a center of gravity of the first different-refractive index region in an x-direction ranges from 0.31a to 0.37a, and a distance between the center of gravity of the second different-refractive index region and the center of gravity of the first different-refractive index region in a y-direction ranges from 0.14a to 0.2a; and a distance between a center of gravity of the third different-refractive index region and the center of gravity of the first different-refractive index region in the x-direction ranges from 0.14a to 0.2a, and a distance between the center of gravity of the third different-refractive index region and the center of gravity of the first different-refractive index region in the y-direction ranges from 0.31a to 0.37a, where a is a lattice constant.

Preferably, the first different-refractive index region, the second different-refractive index region and the third different-refractive index region have the same or different shapes within a periodic plane.

Preferably, the shapes of the first different-refractive index region, the second different-refractive index region and the third different-refractive index region within the periodic plane are selected from at least one of a circle, a rectangle, an ellipse, or a triangle.

Preferably, a sum of an area of the first different-refractive index region, an area of the second different-refractive index region and an area of the third different-refractive index region accounts for 5% to 20% of a total area of the photonic crystal layer.

Preferably, the first different-refractive index region, the second different-refractive index region and the third different-refractive index region have the same or different thicknesses in a range from 0.5a to 5a.

Preferably, cross-sectional shapes of the first different-refractive index region, the second different-refractive index region and the third different-refractive index region in a direction perpendicular to the periodic plane are selected from at least one of a rectangle, a cone, a trapezoid, or a droplet shape.

Preferably, the first different-refractive index region, the second different-refractive index region and the third different-refractive index region are made of the same material, and the base material and the material of the first different-refractive index region, the second different-refractive index region and the third different-refractive index region are selected from one or two of a semiconductor material, a gas, an insulator, or a metal.

Preferably, the semiconductor material is selected from an elementary substance or an alloy material in group III-V, group II-VI or group IV.

The present disclosure provides a two-dimensional photonic crystal surface emitting laser. The two-dimensional photonic crystal is formed by three independent photonic crystal structures with the same lattice constant, which are nested with each other according to a predetermined lattice offset, so that a mode coupling coefficient in the photonic crystal may be adjusted separately in a direction parallel to a lattice period and a direction perpendicular to the lattice period. In the photonic crystal constructed by this method, each unit cell includes three discrete regions having a different refractive index from a base material. The surface emitting laser based on the photonic crystal structure may maintain the single-mode operating characteristics of the device under a large mode field area, so that a high-power single-mode surface emitting laser may be achieved.

BRIEF DESCRIPTION OF THE DRAWINGS

In order to more clearly illustrate the embodiments of the present disclosure or the technical solutions of the prior art, the drawings required for use in the embodiments or the description of the prior art will be briefly introduced below. Obviously, the drawings described below are merely some embodiments of the present disclosure. Those ordinary skilled in the art may achieve additional drawings according to these drawings without carrying out any inventive effort.

DETAILED DESCRIPTION OF THE EMBODIMENTS

In order to enable those skilled in the art to better understand the solutions of the present disclosure, the present disclosure will be further described below with reference to the drawings and specific embodiments. Obviously, the described embodiments are merely some embodiments rather than all embodiments of the present disclosure. Based on the embodiments in the present disclosure, all additional embodiments obtained by those ordinary skilled in the art without carrying out inventive effort fall within the scope of protection of the present disclosure.

As mentioned above, in practical applications of lasers, it is desired that the device always operates in a fundamental mode, but this is generally difficult to achieve. Especially, when the photonic crystal device has a large area, a threshold difference between a fundamental mode and a higher-order mode is generally small, then in a case of a large injection current, the laser may exhibit a multi-mode operating state. In addition, a threshold difference between different band edge modes may also affect a stability of a single-mode operation of the device.

In view of this, it is needed to increase a threshold gain difference between the fundamental mode and the higher-order mode inside the resonant cavity. A photonic crystal cavity corresponds to four band edges at a second-order Γ point. When designing the cavity, a mode loss of one band edge may be selectively reduced so that the band edge has priority over the other three band edges for lasing. However, the lasing band edge still has many fundamental transverse modes. Therefore, it is possible to precisely control the coupling coefficient of the photonic crystal cavity to increase a loss difference between the fundamental transverse mode and other modes, so that the device may still operate stably in a minimum threshold mode when a size of the photonic crystal resonant cavity is increased, thereby achieving a single-mode laser.

Figure 1:
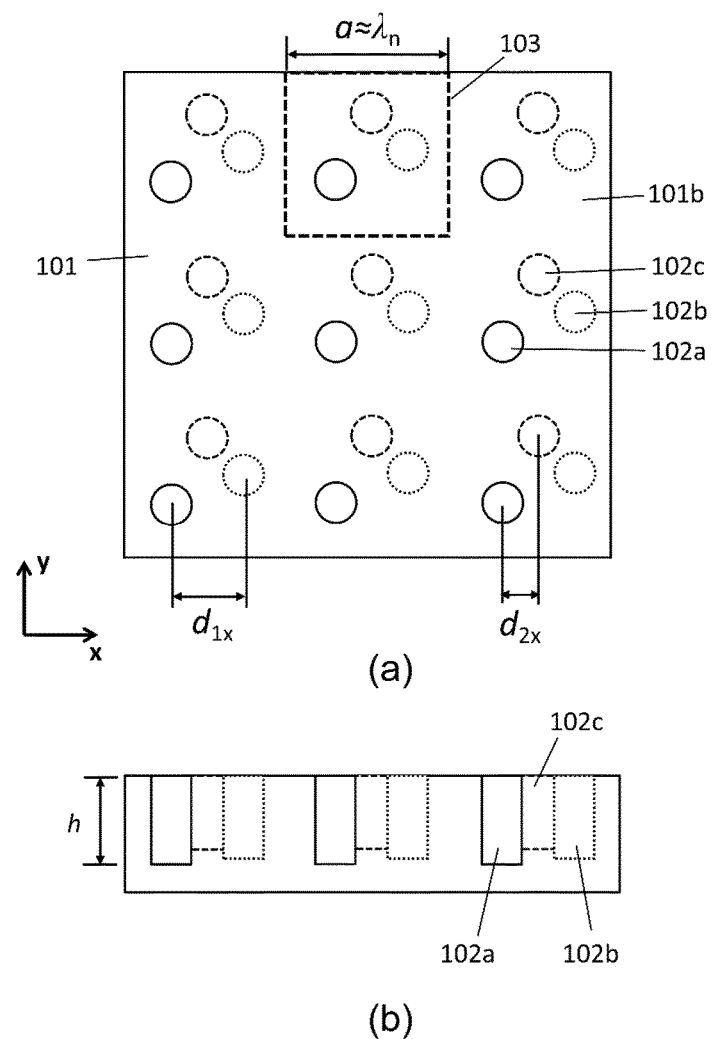
FIG. 1 shows a schematic structural diagram of a two-dimensional photonic crystal in a two-dimensional photonic crystal surface emitting laser according to the present disclosure.

The two-dimensional photonic crystal in this embodiment has a structure shown in FIG. 1, where (a) of FIG. 1 shows a top view and (b) of FIG. 1 shows a front view. The photonic crystal has a square lattice structure, which has the same lattice constant a in two periodic arrangement directions perpendicular to each other, and the lattice constant is approximately equal in numerical value to a lasing wavelength $\lambda_n$ of the laser involved in this embodiment in a material. In this embodiment, the lattice constant is set to 280 nm.

A photonic crystal layer 101 includes a base material 101b and a plurality of unit cells 103 arranged periodically. Each unit cell 103 of the two-dimensional photonic crystal includes three regions having a different refractive index from the base material 101b, namely a first different-refractive index region 102a, a second different-refractive index region 102b and a third different-refractive index region 102c. In this embodiment, these three regions have the same refractive index.

In this embodiment, the first different-refractive index region 102a, the second different-refractive index region 102b and the third different-refractive index region 102c have the same or different shapes within a periodic plane, which may be selected from at least one of a circle, a rectangle, an ellipse or a triangle, preferably a circle. Cross-sectional shapes of the first different-refractive index region, the second different-refractive index region and the third different-refractive index region in a direction perpendicular to the periodic plane may be selected from at least one of a rectangle, a cone, a trapezoid, or a droplet shape.

In this embodiment, a sum of an area of the first different-refractive index region 102a, an area of the second different-refractive index region 102b and an area of the third different-refractive index region 102c accounts for 5% to 20%, preferably 3.3%, of a total area of an entire region including a base material region, the first different-refractive index region, the second different-refractive index region and the third different-refractive index region (a duty cycle, i.e., a ratio of the area of unit cells to a total area of the photonic crystal layer).

In this embodiment, the first different-refractive index region 102a, the second different-refractive index region 102b and the third different-refractive index region 102c have the same or different thicknesses in a range from 0.5a to 5a, preferably 200 nm.

In this embodiment, a centroid distance between the first different-refractive index region 102a and the second different-refractive index region 102b in an x-direction is denoted as $d_{1x}$, which is 97 nm, and a centroid distance between the first different-refractive index region 102a and the third different-refractive index region 102c in the x direction is denoted as $d_{2x}$, which is 48 nm. The photonic crystal structure in this embodiment is symmetric about y=x. The photonic crystal resonant cavity has a diameter of 500 μm, and the photonic crystal resonant cavity refers to a region where the unit cells 103 are distributed in the photonic crystal layer.

In this embodiment, the first different-refractive index region 102a, the second different-refractive index region 102b and the third different-refractive index region 102c are made of the same material. The base material and the material of the first different-refractive index region 102a, the second different-refractive index region 102b and the third different-refractive index region 102c are selected from one or two of a semiconductor material, a gas, an insulator or a metal. The semiconductor material is an elementary substance or an alloy material in group III-V, group II-VI or group IV.

Figure 2:
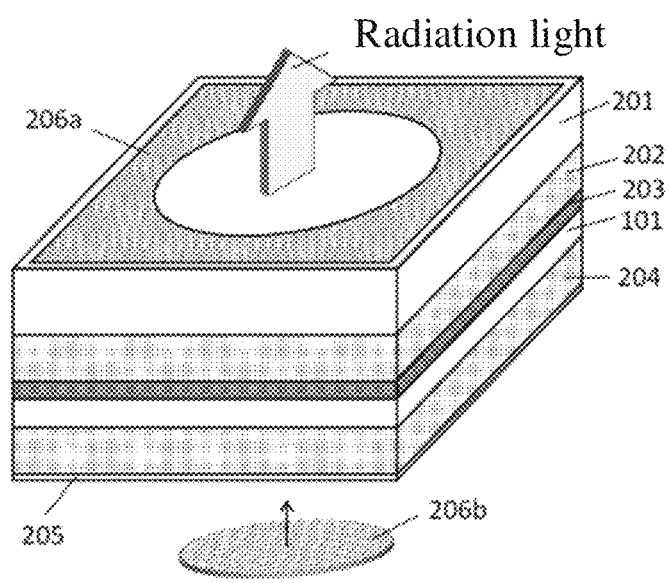
FIG. 2 shows a schematic diagram of a three-dimensional structure of a two-dimensional photonic crystal surface emitting laser according to the present disclosure.

FIG. 2 shows an overall structure of the photonic crystal surface emitting laser described in this embodiment which is constructed with the two-dimensional photonic crystal as the resonant cavity. The laser has a plurality of functional layers in a direction perpendicular to a junction plane, including an n-doped substrate 201 having a material component of GaAs, an n-doped cladding layer 202 having a material component of $Al_{0.7}Ga_{0.3}As$, an active layer 203 having a material component of InGaAs multiple quantum well, a photonic crystal layer 101 having a material component of GaAs, a p-doped cladding layer 204 having a material component of $Al_{0.4}Ga_{0.6}As$, and a p-doped contact layer 205 having a material component of GaAs, which are arranged in sequence. The photonic crystal layer 101 mainly functions to adjust a light field in the laser to construct the resonant cavity mode. The active layer functions to continuously amplify the light in the resonant mode to achieve lasing of the laser. In addition, in order to achieve a valid electrical injection, a square Ni/Au-Ge/Ni/Au metal film 206a is deposited on a surface of the n-doped substrate 201, a circular Ti/Pt/Au metal film 206b is deposited on a surface of the p-doped contact layer 205, and a circular light emitting hole is provided at a center of the square Ni/Au-Ge/Ni/Au metal film.

Figure 3:
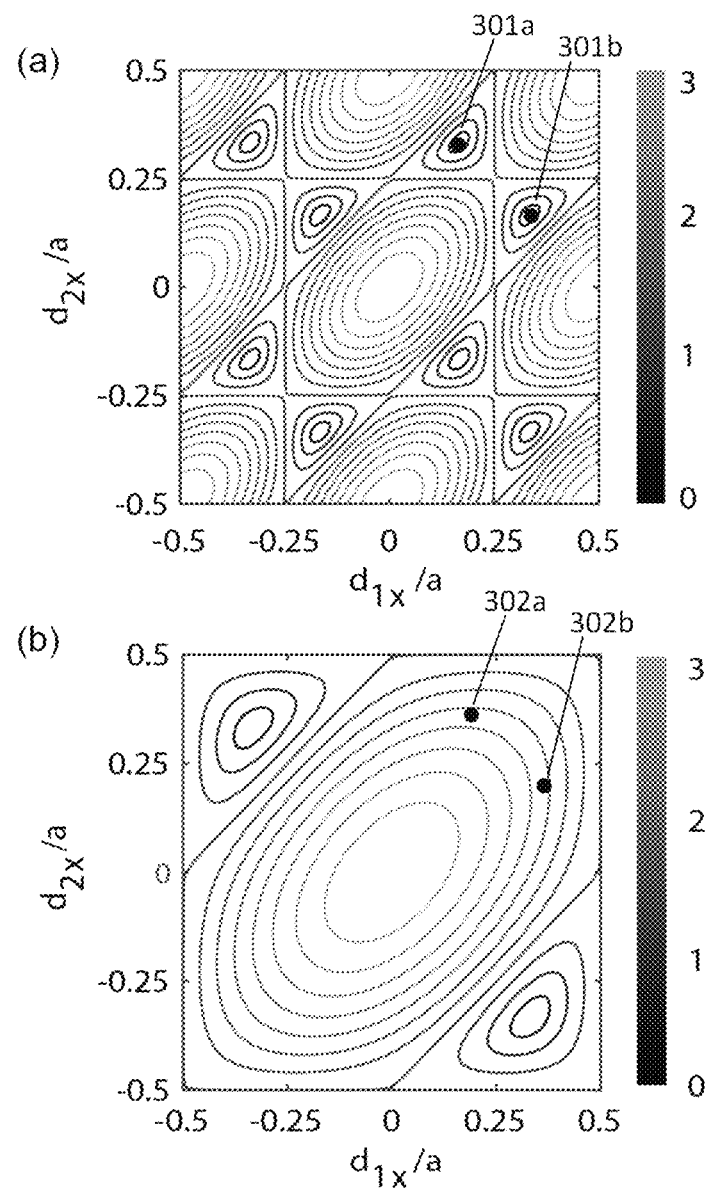
FIG. 3 shows a schematic diagram of a principle of the two-dimensional photonic crystal shown in FIG. 1 increasing a mode threshold difference.
Figure 4:
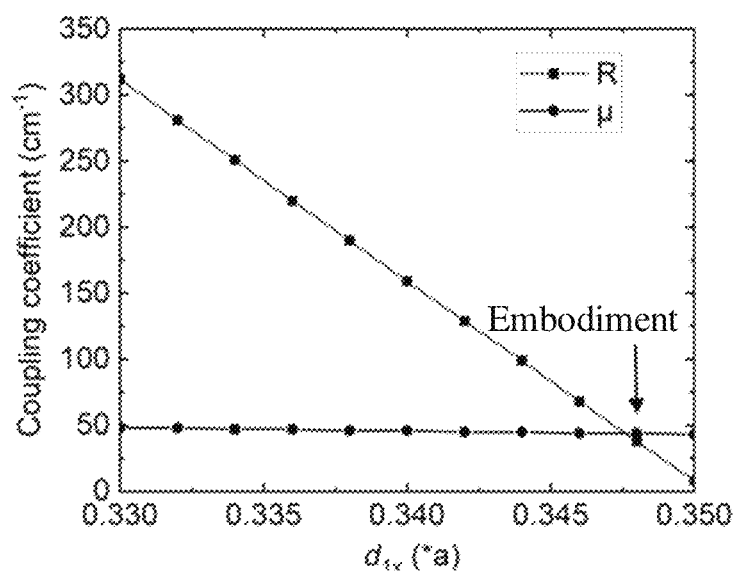
FIG. 4 shows a diagram of adjusting a coupling coefficient of the two-dimensional photonic crystal shown in FIG. 1.

FIG. 3 shows a functional relationship between a relative size of a second-order expansion coefficient and $d_{1x}$, $d_{2x}$ as well as a functional relationship between a relative size of a first-order expansion coefficient and $d_{1x}$, $d_{2x}$ after Fourier expansion of the refractive index distribution of the photonic crystal, and the results are shown in (a) and (b) of FIG. 3 respectively, where a value of ($d_{1x}$, $d_{2x}$) is (0.17a, 0.33a) at point 301a and (0.33a, 0.17a) at point 301b. According to literature [Inoue, T. et al. Nat. Commun. 13,3262(2022).], in order to achieve a single-mode laser, it is needed to maintain a large mode threshold difference, which requires maintaining a low one-dimensional coupling intensity (positively correlated with the second-order Fourier coefficient of the refractive index distribution). According to (a) of FIG. 3, the second-order Fourier coefficient has minimum values at points 301a and 301b, and it is conductive to achieving a single-mode laser if taking values near these points. Moreover, according to (b) of FIG. 3, these two points are far away from a minimum point of the first-order coefficient, thus ensuring that the laser has a sufficient vertical light output. Based on the design shown in FIG. 3, $d_{1x}$ may be further optimized, and FIG. 4 shows a functional relationship between a coupling coefficient R and $d_{1x}$ ($d_{2x}$ is fixed to 0.17a) and a functional relationship between a coupling coefficient μ and $d_{1x}$. When the value of $d_{1x}$ is 0.348a, R≈μ, and the laser constructed based on this may achieve a maximum threshold gain difference. The photonic crystal structure parameters shown in FIG. 1 also correspond to that point.

Figure 5:
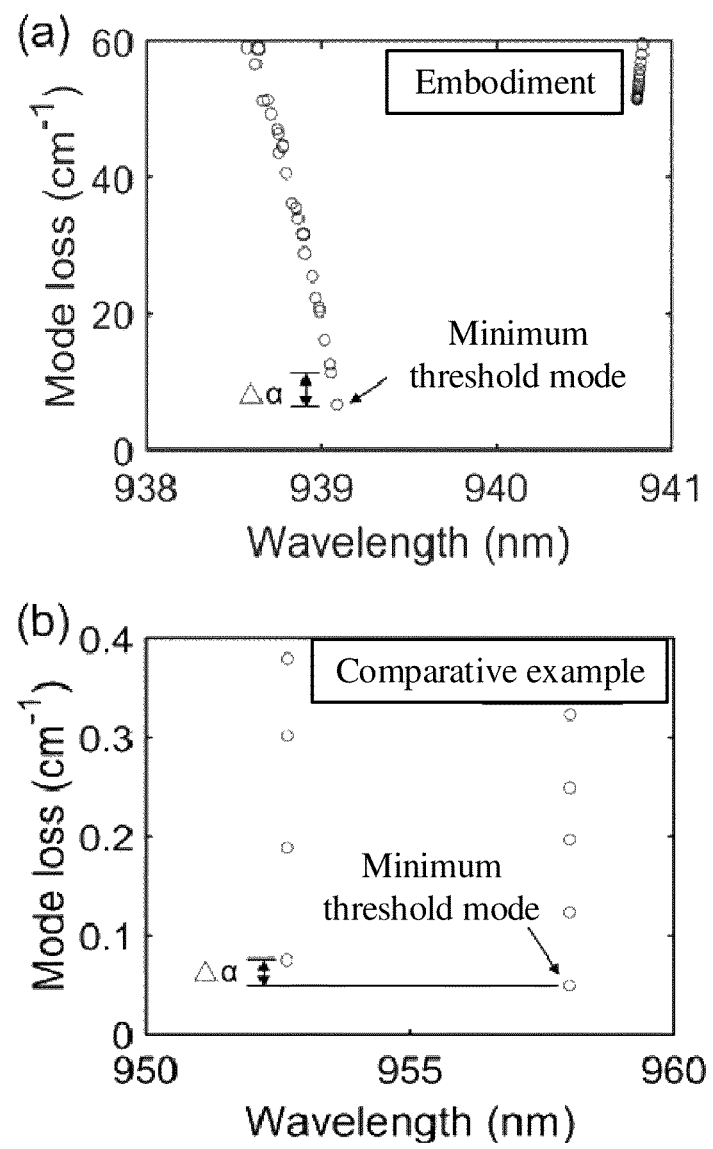
FIG. 5 shows resonant mode distributions respectively corresponding to an embodiment of the present disclosure and a comparative example.
Figure 6:
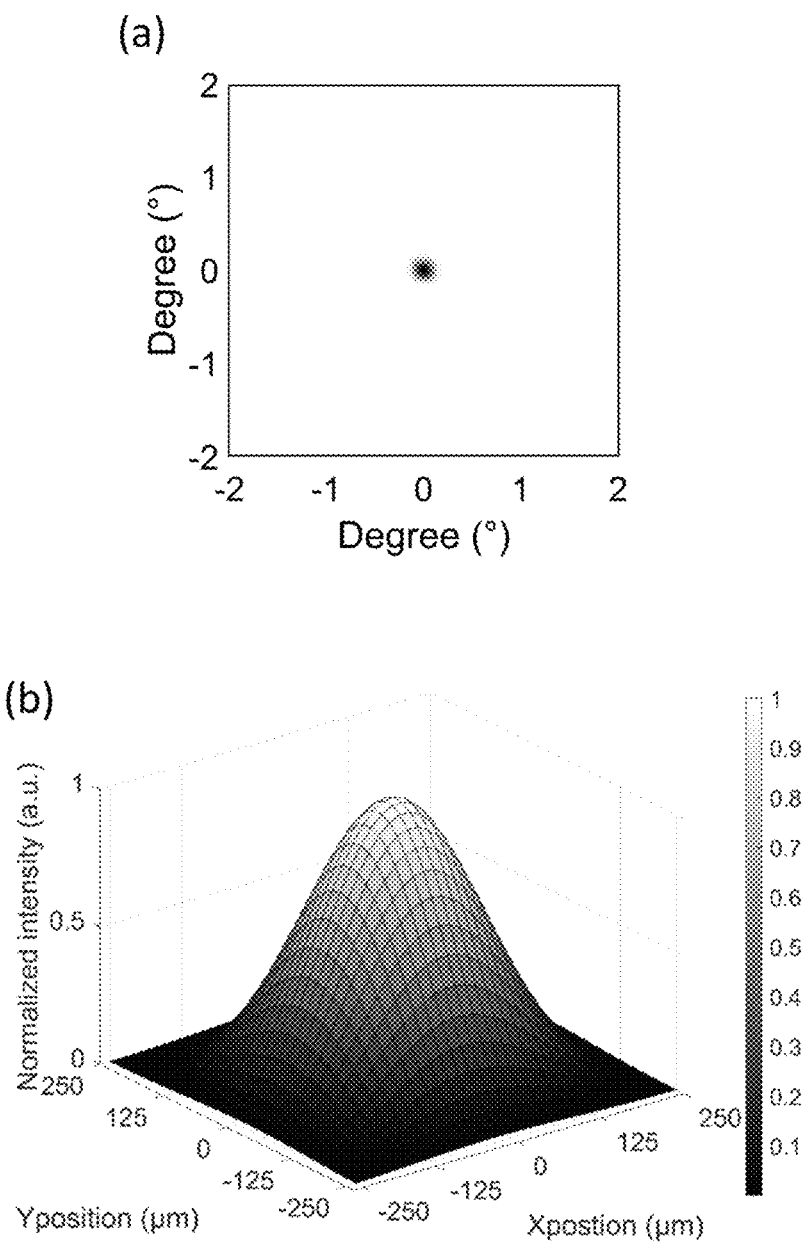
FIG. 6 shows far-field and near-field simulation results of an embodiment of the present disclosure.

(a) of FIG. 5 shows a mode distribution diagram of this embodiment, where a threshold difference Δa between the fundamental mode and the higher-order mode is 4.65 $cm^{-1}$, which meets the resonant cavity requirements of the single-mode laser. For comparison, (b) of FIG. 5 shows a mode distribution of a comparative example, where a hole shape in the unit cell is a single circular hole with a duty cycle of 10%, and the threshold difference of this structure is only 0.026 $cm^{-1}$. (a) and (b) of FIG. 6 show the far-field and near-field simulation results corresponding to this embodiment. As shown, the laser has a near field with a near-Gaussian distribution and a single-lobe far field with a divergence angle of less than 0.3°.

The technical features of the above-mentioned embodiments may be combined arbitrarily. To make the description concise, not all possible combinations of the technical features in the above-mentioned embodiments are described. However, any combination of these technical features without contradiction should be considered to fall within the scope of the specification.

Several implementations of the present disclosure are illustrated in detail in the above-mentioned embodiments, which should not be understood as limiting the scope of protection of the present disclosure. It should be noted that for those ordinary skilled in the art, modifications and improvements may be made without departing from the concept of the present disclosure, which all fall within the scope of protection of the present disclosure. Therefore, the scope of protection of the present disclosure should be defined by the appended claims.

What is claimed is:

1. A two-dimensional photonic crystal surface emitting laser, comprising an n-doped substrate, an n-doped cladding layer, an active layer, a photonic crystal layer, a p-doped cladding layer and a p-doped contact layer arranged in sequence from top to bottom;

wherein the photonic crystal layer comprises identical unit cells arranged periodically, each unit cell comprises a first different-refractive index region, a second different-refractive index region and a third different-refractive index region, all of which are mutually independent and have different refractive indices from a base material;

a distance between a center of gravity of the second different-refractive index region and a center of gravity of the first different-refractive index region in an x-direction ranges from 0.31a to 0.37a, and a distance between the center of gravity of the second different-refractive index region and the center of gravity of the first different-refractive index region in a y-direction ranges from 0.14a to 0.2a; and a distance between a center of gravity of the third different-refractive index region and the center of gravity of the first different-refractive index region in the x-direction ranges from 0.14a to 0.2a, and a distance between the center of gravity of the third different-refractive index region and the center of gravity of the first different-refractive index region in the y-direction ranges from 0.31a to 0.37a, where a is a lattice constant;

wherein a square metal film is deposited on a surface of the n-doped substrate, a circular metal film is deposited on a surface of the p-doped contact layer, and a circular light emitting hole is provided at a center of the square metal film;

wherein a sum of an area of the first different-refractive index region, an area of the second different-refractive index region and an area of the third different-refractive index region accounts for 5% to 20% of a total area of an entire region comprising a base material region, the first different-refractive index region, the second different-refractive index region and the third different-refractive index region.

2. The two-dimensional photonic crystal surface emitting laser according to claim 1, wherein the square metal film is Ni/Au-Ge/Ni/Au metal film, and the circular metal film is Ti/Pt/Au metal film.

3. The two-dimensional photonic crystal surface emitting laser according to claim 1, wherein the first different-refractive index region, the second different-refractive index region and the third different-refractive index region have the same shape within a periodic plane.

4. The two-dimensional photonic crystal surface emitting laser according to claim 3, wherein the shapes of the first different-refractive index region, the second different-refractive index region and the third different-refractive index region within the periodic plane are selected from at least one of a circle, a rectangle, an ellipse, or a triangle.

5. The two-dimensional photonic crystal surface emitting laser according to claim 1, wherein the first different-refractive index region, the second different-refractive index region and the third different-refractive index region have the same or different thicknesses in a range from 0.5a to 5a, where a is a lattice constant.

6. The two-dimensional photonic crystal surface emitting laser according to claim 1, wherein cross-sectional shapes of the first different-refractive index region, the second different-refractive index region and the third different-refractive index region in a direction perpendicular to the periodic plane are selected from at least one of a rectangle, a cone, a trapezoid, or a droplet shape.

7. The two-dimensional photonic crystal surface emitting laser according to claim 1, wherein the first different-refractive index region, the second different-refractive index region and the third different-refractive index region are made of the same material, and the base material and the material of the first different-refractive index region, the second different-refractive index region and the third different-refractive index region are selected from one or two of a semiconductor material, a gas, an insulator, or a metal.

8. The two-dimensional photonic crystal surface emitting laser according to claim 7, wherein the semiconductor material is selected from an elementary substance or an alloy material in group III-V, group II-VI or group IV.

* * * * *